(12) United States Patent
Qiu et al.

(10) Patent No.: US 8,212,064 B2
(45) Date of Patent: Jul. 3, 2012

(54) ETHYLENE TETRAFLUOROETHYLENE INTERMEDIATES

(75) Inventors: Weiming Qiu, Wilmington, DE (US);
Anilkumar Raghavanpillai, Wilmington, DE (US); Michael Francis Vincent, West Chester, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 804 days.

(21) Appl. No.: 12/152,312

(22) Filed: May 14, 2008

(65) Prior Publication Data

US 2009/0287010 A1    Nov. 19, 2009

(51) Int. Cl.
C07C 331/02    (2006.01)
C07C 19/16    (2006.01)
C07C 31/34    (2006.01)
C07C 213/00    (2006.01)
C07C 69/62    (2006.01)

(52) U.S. Cl. ......... 558/15; 564/508; 560/219; 570/137; 568/842

(58) Field of Classification Search ............... 558/15; 564/508; 560/219; 570/137; 568/842
See application file for complete search history.

(56) References Cited

U.S. PATENT DOCUMENTS

| | | | |
|---|---|---|---|
| 2,411,158 A | 11/1946 | Hanford |
| 2,433,844 A | 1/1948 | Hanford |
| 2,559,628 A | 7/1951 | Joyce, Jr. |
| 2,562,547 A | 7/1951 | Hanford |
| 3,016,407 A | 1/1962 | Brace |
| 3,105,824 A | 10/1963 | Green et al. |
| 3,818,074 A | 6/1974 | Ahlbrecht |
| 3,883,604 A | 5/1975 | Rudolph et al. |
| 3,956,000 A | 5/1976 | Kuhls et al. |
| 4,073,817 A | 2/1978 | Jager |
| 4,219,681 A | 8/1980 | Schwenk et al. |
| 4,612,357 A | 9/1986 | Bekiarian et al. |
| 4,791,223 A | 12/1988 | Lantz et al. |
| 5,268,516 A | 12/1993 | Bertocchio et al. |
| 5,459,212 A | 10/1995 | Krespan et al. |
| 5,481,028 A | 1/1996 | Petrov et al. |
| 5,574,193 A | 11/1996 | Krespan et al. |
| 5,639,923 A | 6/1997 | Von Werner |
| 5,763,552 A | 6/1998 | Feiring et al. |
| 5,908,966 A | 6/1999 | Krespan et al. |
| 6,025,521 A | 2/2000 | Krespan et al. |
| 6,136,373 A | 10/2000 | Back et al. |
| 6,376,705 B1 | 4/2002 | Qiu |
| 7,214,736 B2 | 5/2007 | Audenaert et al. |
| 2002/0160116 A1 | 10/2002 | Nordal et al. |
| 2005/0148790 A1 | 7/2005 | Homoto et al. |
| 2005/0197273 A1 | 9/2005 | Savu et al. |
| 2007/0142541 A1 | 6/2007 | Hintzer et al. |
| 2009/0148654 A1* | 6/2009 | Brown et al. ............. 428/96 |
| 2009/0149096 A1* | 6/2009 | Brown et al. ............. 442/80 |

FOREIGN PATENT DOCUMENTS

| | | |
|---|---|---|
| EP | 718262 | 12/1994 |
| EP | 1 762 566 A1 | 3/2007 |
| GB | 1 210 730 | 10/1970 |
| GB | 1 373 320 | 11/1974 |
| JP | 53141187 | 12/1978 |
| JP | 5903313 | 2/1984 |
| JP | 63222695 | 3/1987 |
| JP | 1994157617 A | 6/1994 |
| JP | 1994248014 A | 9/1994 |
| JP | 1994248016 A | 9/1994 |
| JP | 1994308575 A | 11/1994 |
| JP | 1995252447 | 10/1995 |
| JP | 1996053569 A | 2/1996 |
| JP | 1996231165 A1 | 9/1996 |
| JP | 3269270 B2 | 3/2002 |
| JP | 2002128833 A | 5/2002 |
| JP | 2002316956 A | 10/2002 |
| JP | 2004131493 A | 4/2004 |
| JP | 2004256406 A | 9/2004 |
| JP | 2004269413 A | 9/2004 |
| WO | WO 01/21678 A1 | 3/2001 |
| WO | WO 2008/019111 A2 | 2/2008 |
| WO | 2009076108 A | 6/2009 |
| WO | 2009076109 A | 6/2009 |
| WO | WO 2009/076108 * | 6/2009 |
| WO | WO 2009/076109 * | 6/2009 |

OTHER PUBLICATIONS

Haszeldine, Reactions of fluorocarbon radicals. I. The reaction of iodotrifluoromethane with theylene and tetrafluoroethylene; J. of the Chemical Society (1949), 2856-61.
Afanas'Ev et al., Radical reaction of ethylene and tetrafluoroethylene with isopropyl halides; Zhumal Obshchei Khimii (1966), 2(3), 423-6.
Piccardi et al., Reactions of 3,3,4,4-Tetrafluorohexa-1,5-diene. Part II. Cyclisation to a Four-membered Ring in the Thermal Addition of Pentafluoroiodoethane; J. Chem. Soc. (3), (1971), 3959-3966.
Santoro et al., Mass Spectra of Some Partially Fluorinated Aliphatic Compounds; Organic Mass Spectrometry (1973), 123-131; Heyden & Son Limited. Printed in Northern Ireland.
Rondestvedt et al, Nucleophilic Displacements on β-(Perfluoroalkyl)ethyl Iodides. Synthesis of Acrylates Containing Heteroatoms, Journal of Organic Chemistry (1977), 42(16), 2680-2683.
Zhuravlev et al., Reactions of fluorine-containing free radicals in solution, III. Kinetics of the addition of CF3CH2, (CF3)2CH, and CH3CF2 radicals to fluoroethylenes; Zhurnal Organicheskoi Khimii (1983), 19(10), 2022-7.

(Continued)

Primary Examiner — Joseph Kosack

(57) ABSTRACT

An oligomer of the formula (I):

$$C_nF_{2n+1}(CH_2)_x[(CF_2CF_2)_y(CH_2CH_2)_z]_mG \quad (I)$$

wherein
G is an I; OH; $OC(O)CH=CH_2$; $OC(O)CCH_3=CH_2$; $OC(O)CCl=CH_2$; $NR_1H$; $N_3$; NCO; SQ wherein Q is H, alkyl, $(CH_2)_nOH$, $(CH_2)_nNH_2$, $(CH_2)_nOC(O)C(Me)=CH_2$, or $(CH_2)_nNHC(O)C(Me)=CH_2$; SCN; COOH; $SO_3H$; $NHCOCH=CH_2$; $NHCOC(CH_3)=CH_2$; $OC(O)NHCH_2CH_2OC(O)C(CH_3)=CH_2$; or $OC(O)NHCH_2CH_2OC(O)C(CH_3)=CH_2$;
subscript n is an integer from 1 to about 6,
subscript x is an integer from 1 to about 6,
subscripts y, z and m are each independently 1, 2 or 3, or a mixture thereof,
the total number of carbons in said formula (I) excluding G ranges from about 8 to about 22,
and a process for preparation thereof.

15 Claims, No Drawings

OTHER PUBLICATIONS

Jouani et al., Nouvelles methods de preparation des 2-F-alkylethylamines, Journal of Fluorine Chemistry (1991) 55, 85-92. Elsevier Sequoia, Lausanne.

Trabelsi et al., Synthese des 2-F-alkylethylamines: optimization de l'obtention des azortures de 2-F-alkyethyle et de leur reduction en amines; Journal of Fluorine Chemistry (1994), 69, 115-117.

Morelli et al, The vacuum pyrolysis and thermal degradation in air of irradiated poly(ethylene-co-tetrafluoroethylene) films; Journal of Analytical and Applied Pyrolysis (1995), 35, 121-141.

Nixon et al., Pentafluoro-$\lambda^6$-sulfanyl ($SF_5$) perfluoroalkyl iodides-synthesis and reaction with ethylene and tetrafluoreothylene. Crystal Structure of $SF_5(CF_2)_4CH_2CH_2I$; Journal of Fluorine Chemistry (2004), 125(4), 553-560.

Smirov et al., Effect of the surface treatment of reinforcing glass fabric on the strength properties of glass fiber composites based on thermoplastic matrix. Part V. Perfluorinated laminated matrixes; Publisher: ZAO NP "Plasticheskie Massy".

\* cited by examiner

ETHYLENE TETRAFLUOROETHYLENE INTERMEDIATES

FIELD OF THE INVENTION

This invention relates to the field of ethylene-tetrafluoroethylene iodide oligomers and to derivatives derived therefrom, in particular to alcohols, acrylates (meth)acrylates, amines, azides, isocyanates, thiols, thiocyanates, carboxylic acids, sulfonic acids, acrylamides, methacrylamides, urethane acrylates and urethane (meth)acrylates.

BACKGROUND OF THE INVENTION

Polyfluorinated monomers are used in the preparation of a wide variety of fluoropolymers and fluoroelastomers useful as surface protection agents to treat substrates to provide various surface effects to the substrates. Such surface protection agents include oil- and water repellents, non-soiling agents, non-stick agents, surfactants and other treating agents. The surface protection business essentially relies on fluorinated intermediates to prepare such surface protection agents.

The copolymerization of tetrafluoroethylene and ethylene is commercially used for the production of copolymers with a predominately alternating tetrafluoroethylene and ethylene structure such as TEFZEL, (a registered trademark of E. I. du Pont de Nemours and Company), a fluoropolymer of high molecular weight of about 10,000 to about 200,000. U.S. Pat. No. 3,956,000 discloses the telomerization of perfluoroethyl iodide or 1,2-diodotetrafluoroethylene with tetrafluoroethylene, and optionally with a lesser amount of chlorotrifluoroethylene, bromotrifluoroethylene, iodotrifluoroethylene, hexafluoropropylene, 1,1-difluoroethylene or ethylene, to make fluorocarbon waxes with a molecular weight of 10,000 to 200,000 by use of an emulsion process using a purely aqueous phase as the reaction media while applying specific stirring energy. Using up to 15% of telogen and at least 85% olefins is disclosed. This technology does not permit useful oligomeric iodides with a molecular weight less than 2,000. This patent does not disclose oligomerization of tetrafluoroethylene and ethylene to produce short-chain oligomeric iodides or other useful oligomeric derivatives.

Customer requirements for intermediates for surface protection products are in a state of constant evolution, and there is a continuing need for new cost-effective, environmentally friendly chemical intermediates and products. Industry is constantly searching for compounds with minimum environmental impact and higher fluorine efficiency. In particular there is a need for short chain fluorochemicals wherein some of the expensive fluorocarbon moieties have been replaced with less expensive and more readily biodegradable moieties. The present invention provides such fluorochemicals.

BRIEF SUMMARY OF THE INVENTION

The present invention comprises a compound of the formula (I):

$$C_nF_{2n+1}(CH_2)_x[(CF_2CF_2)_y(CH_2CH_2)_z]_mG \quad (I)$$

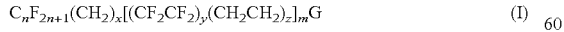

wherein
G is an iodide (I); hydroxyl (OH); acrylate (OC(O)CH=CH$_2$); methacrylate (OC(O)CCH$_3$=CH$_2$); chloroacrylate(OC(O)CCl=CH$_2$); amine (NR$_1$H); azide (N$_3$); isocyanate (NCO); thiol or thiol derivative [SQ wherein Q=H, alkyl, (CH$_2$)$_n$OH, (CH$_2$)$_n$NH$_2$, (CH$_2$)$_n$OC(O)C(Me)=CH$_2$, or (CH$_2$)$_n$NHC(O)C(Me)=CH$_2$]; thiocyanate (SCN); carboxylic acid (COOH); sulfonic acid (SO$_3$H); acrylamide (NHCOCH=CH$_2$); methacrylamide (NHCOC(CH$_3$)=CH$_2$); or urethane (meth)acrylate group ([OC(O)NHCH$_2$CH$_2$OC(O)C(CH$_3$)=CH$_2$] and [OC(O)NHCH$_2$CH$_2$OC(O)C(CH$_3$)=CH$_2$]);
subscript n is an integer from 1 to about 6,
subscript x is an integer from 1 to about 6, subscripts y, z and m are each independently 1, 2 or 3, or a mixture thereof, and
the total number of carbons in said formula (I) excluding G ranges from about 8 to about 22.

The present invention further comprises a process for the preparation of a compound of formula (I) as described above wherein G is iodide comprising oligomerization of a perfluoroalkyl iodide, perfluoroalkylethyl iodide or perfluoroalkylmethyl iodide with a mixture of tetrafluoroethylene and ethylene in the ratio of iodide to a mixture of tetrafluoroethylene and ethylene, each in the gas phase, of from about 1:3 to about 20:1.

DETAILED DESCRIPTION OF THE INVENTION

Trademarks are denoted herein by capitalization.

The term "(meth)acrylate" is used herein to denote either acrylate or methacrylate.

The term "short-chain" is used herein to mean compounds wherein the total number of carbon atoms in the chain is 22 or below.

This invention comprises compounds, in particular oligomer iodides and monomer derivatives thereof, which are intermediates useful for the manufacture of surface protection agents. Examples of such surface protection agents include, for example, surface active agents, compositions providing surface effects to various substrates, and compositions having numerous other uses for which a perfluorinated end group provides special surface-modifying properties. Examples of surface effects provided to substrates, in particular fibrous and hard surface substrates, treated with the surface protection agents include water repellency, oil repellency, soil repellency, and other surface effects. The compounds of the present invention are important intermediates for many applications. See Nandakumar, S. R. and Baker, B. E., in Organofluorine Chemistry; Banks, R. E.; Smart, B. E.; Tatlow, J. C., Ed.; New York and London, 1994; p 321, herein incorporated by reference.

The present invention comprises a compound of formula (I)

$$C_nF_{2n+1}(CH_2)_x[(CF_2CF_2)_y(CH_2CH_2)_z]_mG \quad (I)$$

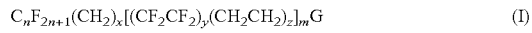

wherein
G is an I; OH; OC(O)CH=CH$_2$; OC(O)CCH$_3$=CH$_2$; OC(O)CCl=CH$_2$; NR$_1$H; N$_3$; NCO; SQ wherein Q is H, alkyl, (CH$_2$)$_n$OH, (CH$_2$)$_n$NH$_2$, (CH$_2$)$_n$OC(O)C(Me)=CH$_2$, or (CH$_2$)$_n$NHC(O)C(Me)=CH$_2$; SCN; COOH; SO$_3$H; NHCOCH=CH$_2$; NHCOC(CH$_3$)=CH$_2$; OC(O)NHCH$_2$CH$_2$OC(O)C(CH$_3$)=CH$_2$; or OC(O)NHCH$_2$CH$_2$OC(O)C(CH$_3$)=CH$_2$;
subscript n is an integer from 1 to about 6,
subscript x is an integer from 1 to about 6,
subscripts y, z and m are each independently 1, 2 or 3, or a mixture thereof,
the total number of carbons in said formula (I) excluding G ranges from about 8 to about 22.

In formula (I), G is an iodide or a group derived from the iodide such as the hydroxyl, acrylate, methacrylate or other groups as defined above. Typically, the iodide is generated initially as an oligomer, and hydroxyl, acrylate, methacrylate or other compounds suitable for use as monomers are generated from the iodide by additional reactions as described later. Preferably G is an iodide, hydroxyl or (meth)acrylate.

The subscript n is a positive integer from 1 to about 6, preferably from about 2 to about 4, and most preferably 2. The subscript x is from 1 to about 6, preferably 1 to about 2, and most preferably 2. The subscripts y, z and m are each independently 1, 2, 3, or a mixture thereof. Preferably, y and z are each 1, and m is 1 or 2. The total number of carbons in the fluorocarbon-hydrocarbon chain (formula (I) excluding G) ranges from about 8 to about 22, preferably from about 8 to about 18, more preferably from about 8 to about 14. The compounds of formula (I) have a maximum molecular weight of from about 200 to about 1500, preferably from about 400 to about 1200, more preferably 400 to about 1000, and more preferably less than about 800.

Particular preferred embodiments of the compounds of the present invention include 1,1,2,2,5,5,6,6-octahydroperfluoro-1-G-octane, or 1,1,2,2,5,5,6,6,9,9,10,10-dodecahydroperfluoro-1-G-decane, or their mixture, wherein G is as defined above. These include the following:

A) 1,1,2,2,5,5,6,6-octahydroperfluoro-1-iodooctane;
B) 1,1,2,2,5,5,6,6,9,9,10,10-dodecahydroperfluoro-1-iodododecane, or a mixture of A) and B);
C) 1,1,2,2,5,5,6,6-octahydroperfluoro-1-iododecane;
D) 1,1,2,2,5,5,6,6,9,9,10,10-dodecahydroperfluoro-1-iodotetradecane, or a mixture of A) and/or B) and/or C) and/or D);
E) 1,1,2,2,5,5,6,6-octahydroperfluoro-1-octanol;
F) 1,1,2,2,5,5,6,6,9,9,10,10-dodecahydroperfluoro-1-dodecanol; or a mixture of E) and F);
G) 1,1,2,2,5,5,6,6-octahydroperfluoro-1-decanol;
H) 1,1,2,2,5,5,6,6,9,9,10,10-dodecahydroperfluoro-1-tetradecanol, or a mixture of E) and/or F) and/or G) and/or H);
I) 1,1,2,2,5,5,6,6-octahydroperfluorooctyl acrylate;
J) 1,1,2,2,5,5,6,6,9,9,10,10-dodecahydroperfluorododecyl acrylate; or a mixture of 1) and J);
K) 1,1,2,2,5,5,6,6-octahydroperfluorodecyl acrylate;
L) 1,1,2,2,5,5,6,6,9,9,10,10-dodecahydroperfluorotetradecyl acrylate; or a mixture of 1) and/or J), and/or K), or and L);
M) 1,1,2,2,5,5,6,6-octahydroperfluorooctyl methacrylate;
N) 1,1,2,2,5,5,6,6,9,9,10,10-dodecahydroperfluorododecyl methacrylate: or a mixture of M) and N);
j) 1,1,2,2,5,5,6,6-octahydroperfluorodecyl methacrylate;
P) 1,1,2,2,5,5,6,6,9,9,10,10-dodecahydroperfluoro-tetradecyl methacrylate; or a mixture of M) and/or N) and/or O and/or P);
Q) 1,1,2,2,5,5,6,6-octahydroperfluorooctyl chloroacrylate;
R) 1,1,2,2,5,5,6,6,9,9,10,10-dodecahydroperfluorododecyl chloroacrylate; or a mixture of Q) and R).
S) 1,1,2,2,5,5,6,6-octahydroperfluorodecyl chloroacrylate; and
T) 1,1,2,2,5,5,6,6,9,9,10,10-dodecahydroperfluorotetradecyl chloroacrylate; or a mixture of Q) and/or R) and/or S) and/or T).

The present invention further comprises a process for the preparation of the compounds of formula (I) as described above wherein G is iodide. The compounds of the present invention are prepared by the oligomerization of fluoroalkyl iodides by a mixture of tetrafluoroethylene and ethylene to produce fluorinated oligomeric ethylene-tetrafluoroethylene iodides. The iodides are used to prepare alkanols, (meth) acrylates, and other derivatives, which are useful as monomers in polymerization reactions to prepare surface protection agents.

The initial product of this oligomerization reaction is a mixture of closely related oligomers. In addition to the major resulting oligomer, there will be other oligomers with slightly longer or shorter chain lengths, as is the nature of such reactions. There will also be a small percentage of oligomers where the ethylene and tetrafluoroethylene depart from the expected alternating sequence. The above formula (I) is intended to comprise not only the original mixture of oligomers from the oligomerization reaction and its alcohol and (meth)acrylate derivatives, but also a purified or partially purified form of these mixtures, as well the individual components of each mixture.

If desired, the major chemicals in the reaction mixture can be separated into individual components by differences in solubilities, melting points, vapor pressures and other features. For example, it has been found that the relative solubilities of such components in acetonitrile and tetrahydrofuran are useful in such purifications, as shown in the examples which follow. Other solvents and methods can also be used, as readily determined by those skilled in the art.

From a practical viewpoint, anything beyond the most simple purification is likely to be an unnecessary expense. When the intermediates of the present invention are converted into a commercial product (for example, surface protection agent), all of the oligomers of the present invention are expected to show similar properties to the major oligomer present, and be useful additions to the final product.

The fluoroalkyl iodides useful as telogen reactants for the preparation of the iodide compounds of formula (I) of the present invention include $C_nF_{2n+1}CH_2CH_2I$, $C_nF_{2n+1}CH_2I$ and $C_nF_{2n+1}I$, wherein n is an integer from 1 to about 6. Preferably n is from about 2 to about 4; more preferably n is 2. The most preferable fluoroalkyl iodide reactant is perfluoromethylethyl iodide.

The iodides of formula (I) of the present invention, $C_nF_{2n+1}(CH_2)_x[(CF_2CF_2)_y(CH_2CH_2)_z]_mI$, wherein m, n, x, y, and z are as defined above, are preferably prepared by oligomerization of $C_nF_{2n+1}C_2H_4$ I, $C_nF_{2n+1}CH_2$ I or $C_nF_{2n+1}$ I using a mixture of ethylene (ET) and tetrafluoroethylene (TFE). The reaction can be conducted at any temperature from room temperature to about 150° C. with a suitable radical initiator. Preferably the reaction is conducted at a temperature of from about 40° to about 100° C. with an initiator which has about a 10 hour half-life in that range. The feed ratio of the starting materials in the gas phase, that is the moles of $C_nF_{2n+1}C_2H_4$ I, $C_nF_{2n+1}CH_2$ I or $C_nF_{2n+1}I$ vs the combined moles of ethylene and tetrafluoroethylene, can be used to control conversion of the reaction. This mole ratio is from about 1:3 to about 20:1, preferably from about 1:2 to 10:1, more preferably from about 1:2 to about 5:1 The mole ratio of ethylene to tetrafluoroethylene is from about 1:10 to about 10:1, preferably from about 3:7 to about 7:3, and more preferably from about 4:6 to about 6:4.

The alcohols of formula (I) of the present invention $C_nF_{2n+1}(CH_2)_x[(CF_2CF_2)_y(CH_2CH_2)_z]_mOH$, wherein m, n, x, y, and z are as described above, are prepared from the above oligomeric iodides ($C_nF_{2n+1}C_2H_4$ I, $C_nF_{2n+1}CH_2$ I or $C_nF_{2n+1}I$) using an oleum treatment and hydrolysis. It has been found, for example, that reacting with oleum (15% $SO_3$) at about 60° C. for about 1.5 hours, followed by hydrolysis using an iced dilute $K_2SO_3$ solution, and then followed by heating to about 100° C. for about 30 minutes gives satisfactory results. But other reaction conditions can also be used. After being cooled to ambient room temperature, a solid is precipitated, isolated and purified. For example, the liquid is then decanted and the solid is dissolved in ether and washed with water saturated with NaCl, dried over anhydrous Na$_2$SO$_4$, and concentrated and dried under vacuum. Other conventional purification procedures can be employed.

Alternatively, the alcohols of formula (I) of the present invention can be prepared by heating the above oligomeric iodides (C$_n$F$_{2n+1}$C$_2$H$_4$ I, C$_n$F$_{2n+1}$CH$_2$ I or C$_n$F$_{2n+1}$I) with N-methylformamide to about 150° C. and holding for about 19 hours. The reaction mixture is washed with water to give a residue. A mixture of this residue with ethanol and concentrated hydrochloric acid is gently refluxed (at about 85° C. bath temperature) for about 2.5 hours. The reaction mixture is washed with water, diluted with dichloromethane, and dried over sodium sulfate. The dichloromethane solution is concentrated and distilled at reduced pressure to give the alcohol. Optionally N,N dimethylformamide can be used instead of N-methylformamide. Other conventional purification procedures can also be employed.

The (meth)acrylates of formula (I) of the present invention, C$_n$F$_{2n+1}$ (CH$_2$)$_x$[(CF$_2$CF$_2$)$_y$(CH$_2$CH$_2$)$_z$]$_m$ OC(O)CR=CH$_2$ (wherein R is H, methyl, or Cl) are prepared from the oligomeric alcohols of formula (I), C$_n$F$_{2n+1}$ (CH$_2$)$_x$ [(CF$_2$CF$_2$)$_y$(CH$_2$CH$_2$)$_z$]$_m$OH, by adding triethylamine and tetrahydrofuran, then reacting with acryloyl chloride, methacryloyl chloride or chloroacryloyl by adding them dropwise in tetrahydrofuran. The solid is removed, typically by filtration, and washed with tetrahydrofuran, and then purified, usually by ether extraction and water-washing, concentrating and drying under vacuum.

Optionally, the (meth)acrylates of formula (I) of the present invention, C$_n$F$_{2n+1}$ (CH$_2$)$_x$[(CF$_2$CF$_2$)$_y$(CH$_2$CH$_2$)$_z$]$_m$ OC(O)CR=CH$_2$ (wherein R is H, methyl, or Cl) can be prepared from the oligomeric alcohols of formula (I), C$_n$F$_{2n+1}$ (CH$_2$)$_x$ [(CF$_2$CF$_2$)$_y$(CH$_2$CH$_2$)$_z$]$_m$OH, by reacting with acrylic, methacrylic or chloroacrylic acid in the presence of an acid catalyst, such as toluenesulfonic acid, and a solvent, such as hexane, heptane, octane, or toluene.

The azides of formula (I) of the present invention C$_n$F$_{2n+1}$ (CH$_2$)$_x$[(CF$_2$CF$_2$)$_y$(CH$_2$CH$_2$)$_z$]$_m$N$_3$, wherein m, n, x, y, and z are as described above, are prepared from the oligomeric iodides (Formula (I) where G is an iodide) using sodium azide as per a modified procedure disclosed in the literature (Rondestvedt, C. S., Jr.; Thayer, G. L., Jr. J. Org. Chem. 1977, 42, 2680). Displacement of iodide to azide is performed in quantitative yields in a mixed solvent system comprising acetonitrile and water in a ratio of about 3:1 using sodium azide at 90° C. Alternatively a solvent system comprising dimethylformamide-water, acetone-water, isopropyl alcohol-water or other similar solvent system can be used for this reaction under similar conditions. A phase transfer reaction as described by Cambon et. al. can be used for this conversion, which produces only moderate yield (20-30%) of the azide after 36 h at 100° C. (Trabelsi, H.; Szoenyi, F.; Michelangeli, N.; Cambon, A. J. Fluorine Chem., 1994, 69, 115-117).

The amines of formula (I) of the present invention C$_n$F$_{2n+1}$ (CH$_2$)$_x$[(CF$_2$CF$_2$)$_y$(CH$_2$CH$_2$)$_z$]$_m$NH$_2$, wherein m, n, x, y, and z are as described above, are prepared from the above oligomeric azides by reduction using hydrazine hydrate and Ni-Raney as per a modified literature procedure (Trabelsi, H.; Szoenyi, F.; Michelangeli, N.; Cambon, A. J. Fluorine Chem., 1994, 69, 115-117). Transformation of oligomer azide to amine is performed in a mixed solvent system comprising 1:1 water and ethanol using hydrazine hydrate/Ni-Raney at 60° for 12 h. and sodium azide. Alternatively, catalytic hydrogenation using Pt/C or various conditions involving other reducing agents also can be used to effect this transformation.

The thiols of formula (I) of the present invention C$_n$F$_{2n+1}$ (CH$_2$)$_x$ [(CF$_2$CF$_2$)$_y$(CH$_2$CH$_2$)$_z$]$_m$SH, wherein m, n, x, y, and z are as described above, are prepared from the oligomeric iodides (Formula (I) where G is an iodide) by the reaction with thiourea followed by hydrolysis of the thiouronium salt as per the literature procedure (Rondestvedt, C. S., Jr.; Thayer, G. L., Jr. J. Org. Chem. 1977, 42, 2680). The oligomeric iodides were refluxed with thiourea in ethanol for 36 h and hydrolyzed using sodium hydroxide to obtain the corresponding oligomeric thiols. Alternatively, displacement reaction using NaSH in ethanol can be used to effect this transformation.

The sulfur-containing alcohols of formula (I) of the present invention C$_n$F$_{2n+1}$ (CH$_2$)$_x$ [(CF$_2$CF$_2$)$_y$(CH$_2$CH$_2$)$_z$]$_m$S(CH$_2$)$_r$OH, wherein m, n, x, y, and z are as described above and r is 1 to 5, are prepared from the oligomeric iodides (Formula (I) where G is an iodide) by the displacement reaction with 2-mercaptoethanol as per the literature procedure (Rondestvedt, C. S., Jr.; Thayer, G. L., Jr. J. Org. Chem. 1977, 42, 2680). The oligomeric iodides were refluxed with 2-mercaptoethanol and sodium hydroxide in tert-butanol for 12 h to obtain the corresponding oligomeric hydroxyethyl sulfide.

The sulfur-containing amines of formula (I) of the present invention C$_n$F$_{2n+1}$ (CH$_2$)$_x$[(CF$_2$CF$_2$)$_y$(CH$_2$CH$_2$)$_z$]$_m$S(CH$_2$)$_r$NH$_2$, wherein m, n, x, y, and z are as described above and r is 1 to 5, are prepared from the oligomeric iodides (Formula (I) where G is an iodide) by the displacement reaction with 2-aminoethanethiol as per the literature procedure. (Rondestvedt, C. S., Jr.; Thayer, G. L., Jr. J. Org. Chem. 1977, 42, 2680). The oligomeric iodides were refluxed with 2-mercaptoethylamine hydrochloride and sodium hydroxide in tert-butanol for 12 h to obtain the corresponding oligomeric aminoethyl sulfide.

The thiocyanates of formula (I) of the present invention C$_n$F$_{2n+1}$(CH$_2$)$_x$ [(CF$_2$CF$_2$)$_y$(CH$_2$CH$_2$)$_z$]$_m$SCN, wherein m, n, x, y, and z are as described above, are prepared from the oligomeric iodides (Formula (I) where G is an iodide) by refluxing with potassium thiocyanate in ethanol or under phase transfer conditions as described in the literature. (Trabelsi, H.; Szoenyi, F.; Michelangeli, N.; Cambon, A. J. Fluorine Chem., 1994, 69, 115-117). The oligomeric thiocyanates can be transformed to other useful intermediates such as C$_n$F$_{2n+1}$ (CH$_2$)$_x$ [(CF$_2$CF$_2$)$_y$(CH$_2$CH$_2$)$_z$]$_m$SO$_2$Cl and C$_n$F$_{2n+1}$ (CH$_2$)$_x$ [(CF$_2$CF$_2$)$_y$(CH$_2$CH$_2$)$_z$]$_m$SO$_2$H.

The carboxylic acids of formula (I) of the present invention C$_n$F$_{2n+1}$ (CH$_2$)$_x$ [(CF$_2$CF$_2$)$_y$(CH$_2$CH$_2$)$_z$]$_m$CO$_2$H, wherein m, n, x, y, and z are as described above, are prepared from the oligomeric iodides (Formula (I) where G is an iodide) by the reaction with Mg followed by treatment of the alkylmagnesium reagent with CO$_2$ as described in the literature (Jouani, A. M.; Szonyi, F.; Cambon, A, J. Fluorine Chem., 1992, 56, 85-92).

The isocyanates of formula (I) of the present invention C$_n$F$_{2n+1}$(CH$_2$)$_x$ [(CF$_2$CF$_2$)$_y$(CH$_2$CH$_2$)$_z$]$_m$NCO, wherein m, n, x, y, and z are as described above, are prepared from the oligomeric iodides (Formula (I) where G is an iodide) by the conversion of the carboxylic acids described above to corresponding acid chloride using PCl$_5$ followed by treatment with trimethylsilylazide or sodium azide (Jouani, A. M.; Szonyi, F.; Cambon, A, J. Fluorine Chem., 1992, 56, 85-92).

The (meth)acrylamides of formula (I) of the present invention, C$_n$F$_{2n+1}$ (CH$_2$)$_x$ [(CF$_2$CF$_2$)$_y$(CH$_2$CH$_2$)$_z$]$_m$ NHC(O)CR=CH$_2$, wherein R is H, methyl, or Cl are prepared from the oligomeric amines of formula (I), C$_n$F$_{2n+1}$ (CH$_2$)$_x$ [(CF$_2$CF$_2$)$_y$(CH$_2$CH$_2$)$_z$]$_m$NH$_2$, by adding triethylamine and methylene chloride, then reacting with acryloyl or methacryloyl or chloroacryloyl chloride by adding them dropwise in methylene chloride. The products are typically isolated by an aqueous work-up using methylene chloride as an extraction solvent.

The urea (meth)acrylates of formula (I) of the present invention, $C_nF_{2n+1}(CH_2)_x[(CF_2CF_2)_y(CH_2CH_2)_z]_mNHC(O)NHCH_2CH_2O(CO)CR=CH_2$ wherein R is H, methyl are prepared from the oligomeric amines of formula (I), $C_nF_{2n+1}(CH_2)_x[(CF_2CF_2)_y(CH_2CH_2)_z]_mNH_2$, by the reaction with corresponding 2-isocyanatoethyl (meth)acrylate in methylene chloride. The solid product is removed, typically by filtration and purified by recrystallization.

The urethane (meth)acrylates of formula (I) of the present invention, $C_nF_{2n+1}(CH_2)_x[(CF_2CF_2)_y(CH_2CH_2)_z]_mOC(O)NHCH_2CH_2O(CO)CR=CH_2$ wherein R is H, methyl are prepared from the oligomeric alcohols of formula (I), $C_nF_{2n+1}(CH_2)_x[(CF_2CF_2)_y(CH_2CH_2)_z]_mOH$, by the reaction with corresponding 2-isocyanatoethyl (meth)acrylate in methylene chloride. The solid product is removed, typically by filtration and purified by repeated washing with a mixture of methylene chloride/hexane.

The thiol derivative, (meth)acrylates of formula (I) of the present invention, $C_nF_{2n+1}(CH_2)_x[(CF_2CF_2)_y(CH_2CH_2)_z]_mS(CH_2)_rOC(O)CR=CH_2$, wherein R is H, methyl, or Cl and r is 1 to 5 are prepared from the oligomeric alcohols of formula (I), $C_nF_{2n+1}(CH_2)_x[(CF_2CF_2)_y(CH_2CH_2)_z]_mS(CH_2)_rOH$, by the reaction with acryloyl or methacryloyl or chloroacryloyl chloride in triethylamine and methylene chloride.

The thiol derivative, urethane (meth)acrylates of formula (I) of the present invention, $C_nF_{2n+1}(CH_2)_x[(CF_2CF_2)_y(CH_2CH_2)_z]_mS(CH_2)_rO—C(O)NHCH_2CH_2O(CO)CR=CH_2$, wherein R is H, methyl and is r is 1 to 5 are prepared from the oligomeric alcohols of formula (I), $C_nF_{2n+1}(CH_2)_x[(CF_2CF_2)_y(CH_2CH_2)_z]_mS(CH_2)_rOH$, by the reaction with corresponding 2-isocyanatoethyl (meth)acrylate in methylene chloride.

The thiol derivative, (meth)acrylamides of formula (I) of the present invention, $C_nF_{2n+1}(CH_2)_x[(CF_2CF_2)_y(CH_2CH_2)_z]_mS(CH_2)_rNHC(O)CR=CH_2$, wherein R is H, methyl, or Cl and r is 1 to 5 are prepared from the oligomeric amines of formula (I), $C_nF_{2n+1}(CH_2)_x[(CF_2CF_2)_y(CH_2CH_2)_z]_mS(CH_2)_rNH_2$, by the reaction with acryloyl or methacryloyl or chloroacryloyl chloride in triethylamine in methylene chloride.

The thiol derivative, urea (meth)acrylates of formula (I) of the present invention, $C_nF_{2n+1}(CH_2)_x[(CF_2CF_2)_y(CH_2CH_2)_z]_mS(CH_2)_rNH—C(O)NHCH_2CH_2O(CO)CR=CH_2$, wherein R is H, methyl and r is 1 to 5 are prepared from the oligomeric amines of formula (I), $C_nF_{2n+1}(CH_2)_x[(CF_2CF_2)_y(CH_2CH_2)_z]_mS(CH_2)_rNH_2$, by the reaction with corresponding 2-isocyanatoethyl(meth)acrylate in methylene chloride.

The general methods described above for preparation of the alcohols and (meth)acrylates, amines, thiols, thiocyanates, and other derivatives are described in more detail in the Examples herein. It will be appreciated that many variations on the above processes can be made by those skilled in the art.

The compounds of the present invention are useful as intermediates in the preparation of surface treatment chemicals and polymers. As described above, the iodides and alcohols of the present invention are useful to prepare acrylates, (meth)acrylates, and other derivatives. The (meth)acrylates are useful intermediates as co-monomers to prepare polymeric surface treatment chemicals. The above alcohols are also useful intermediates for preparation of the corresponding phosphates, alkoxylates, and polyurethanes for surfactant and repellent applications. The process of the present invention is useful to provide iodides employed as intermediates to prepare a wide variety of derivatives as described above.

The following examples are intended only to illustrate the invention, and should not be interpreted so as to limit the invention in any way.

EXAMPLES

Example 1

A 400 mL shaker tube was charged with perfluoromethylethyl iodide (PFEEI) (45 g) and VAZO 64 (1 g), a polymerization initiator available from E. I. du Pont de Nemours and Company, Wilmington, Del. After cool evacuation, ethylene (6 g) and tetrafluoroethylene (25 g) were added. The resulting mixture was heated to 80° C. for 20 hours. The unreacted perfluoromethylethyl iodide was recovered by vacuum distillation at room temperature. The remaining solid was extracted with $CH_3CN$ (3×100 mL). The $CH_3CN$ extracts were concentrated and distilled at reduced pressure to give pure iodide 1,1,2,2,5,5,6,6-octahydroperfluoro-1-iodooctane. The solid remaining after $CH_3CN$ extraction was extracted with warm tetrahydrofuran. The tetrahydrofuran extract was concentrated and dried to give pure 1,1,2,2,5,5,6,6,9,9,10,10-dodecahydroperfluoro-1-iodododecane. The solid remaining after tetrahydrofuran extraction was mainly iodides of formula $C_2F_5(CH_2CH_2CF_2CF_2)_nCH_2CH_2I$ (wherein n=3 and higher oligomers), which have very low solubility in common solvents.

The products 1,1,2,2,5,5,6,6-octahydroperfluoro-1-iodooctane and 1,1,2,2,5,5,6,6,9,9,10,10-dodecahydroperfluoro-1-iodododecane were characterized by H NMR and F NMR as shown below:

1,1,2,2,5,5,6,6-octahydroperfluoro-1-iodooctane: mp 75-77° C.:

H NMR (CDCl3) 2.33 (m, 4H), 2.68 (m, 2H), 3.24 (m, 2H) ppm. F NMR (CDCl3) −85.9 (s, 3F), −115.8 (m, 4F), −119.2 (m, 2F) ppm.

1,1,2,2,5,5,6,6,9,9,10,10-dodecahydroperfluoro-1-iodododecane: mp 125-8° C.:

H NMR (acetone-d6) 2.46 (m, 8H), 2.77 (m, 2H), 3.37 (m, 2H) ppm.

F NMR (acetone-d6) −86.7 (s, 3F), −117.1 (m, 6F), −117.3 (m, 2F), −119.5 (m, 2F) ppm.

Example 2

A 400 mL shaker tube was charged with perfluoroethyl iodide (PFEI) (25 g), VAZO 64 (0.4 g) as in Example 1, and hexane (5 mL). After cool evacuation, ethylene (6 g) and tetrafluoroethylene (25 g) were added. The resulting mixture was heated to 60° C. for 1 hour and 80° C. for 10 hours. The volatiles were removed by vacuum distillation at room temperature. The remaining solid (20 g) was extracted with $CH_3CN$ (3×50 mL). The $CH_3CN$ extracts were concentrated to give 10.5 g of solid, which was mainly 1,1,2,2,5,5,6,6-octahydroperfluoro-1-iodooctane. The solid remaining after $CH_3CN$ extraction was extracted with warm tetrahydrofuran (2×50 mL). The tetrahydrofuran extracts were concentrated and dried to give 5 g of solid, which was mainly 1,1,2,2,5,5,6,6,9,9,10,10-dodecahydroperfluoro-1-iodododecane. The solid remaining after tetrahydrofuran extraction was mainly iodides of formula $C_2F_5(CH_2CH_2CF_2CF_2)_nCH_2CH_2I$ (wherein n=3 and higher oligomers).

Example 3

A one gallon reactor was charged with perfluoromethylethyl iodide (PFEEI) (850 g). After cool evacuation, ethylene and tetrafluoroethylene in a ratio of 27:73 were added until pressure reached 60 psig (413.7×10³ Pa). The reaction was then heated to 70° C. More ethylene and tetrahydrofuran in a 27:73 ratio were added until pressure reached 160 psig (1103.2×10³ Pa). A lauroyl peroxide solution (4 g lauroyl peroxide in 150 g perfluoromethylethyl iodide was added at 1 mL/min rate for 1 hour. Gas feed ratio was adjusted to 1:1 of ethylene and tetrafluoroethylene and the pressure was kept at 160 psig (1103.2×10³ Pa). After about 67 g of ethylene was added, both ethylene and tetrafluoroethylene feeds were stopped. The reaction was heated at 70° C. for another 8 hours. The volatiles were removed by vacuum distillation at room temperature. A solid of oligomer ethylene-tetrafluoroethylene iodides (773 g) was obtained.

Example 4

A 400 mL shaker tube was charged with perfluorobutylethyl iodide (PFBEI) (75 g) and VAZO 64 (1.5 g) as in Example 1. After cool evacuation, ethylene (6 g) and tetrafluoroethylene (25 g) were added. The resulting mixture was heated to 80° C. for 20 hours. Reaction mixtures from 10 identical runs were combined and the unreacted perfluorobutylethyl iodide was recovered by vacuum distillation at room temperature. The remaining solid (648 g) was extracted with $CH_3CN$ (10×300 mL). The combined $CH_3CN$ extracts were concentrated and distilled at reduced pressure to give iodide 1,1,2,2,5,5,6,6-octahydroperfluoro-1-iododecane. The solid remaining after $CH_3CN$ extraction was mainly 1,1,2,2,5,5,6, 6,9,9,10,10-dodecahydroperfluoro-1-iodotetradecane and higher oligomers. The product 1,1,2,2,5,5,6,6-octahydroperfluoro-1-iododecane was characterized by H NMR and F NMR as shown below. 1,1,2,2,5,5,6,6-Octahydroperfluoro-1-iododecane: mp 72-74° C.:

H NMR (CDCl3) 2.36 (m, 4H), 2.69 (m, 2H), 3.25 (m, 2H) ppm. F NMR (CDCl3) −81.5 (tt, J=10, 3 Hz, 3F), −115.3 (m, 2F), −115.7 (m, 4F), −124.7 (m, 2F), −126.4 (m, 2F) ppm.

Example 5

A mixture of 1,1,2,2,5,5,6,6-octahydroperfluoro-1-iodooctane (10 g), prepared as in Example 1, and oleum (15% $SO_3$, 20 mL) was heated to 60° C. for 1.5 h. A $K_2SO_3$ solution (1.5%, in ice-water 150 mL) was added to the reaction mixture while cooled with an ice-water bath. The resulting mixture was heated to 100° C. for 30 min. After being cooled to room temperature, a solid was precipitated. The liquid was decanted and the solid was dissolved in ether (200 mL) and washed with water (2×50 mL), NaCl (sat. 50 mL), dried over anhydrous $Na_2SO_4$, concentrated and dried on vacuum to give 1,1,2,2,5,5,6,6-octahydroperfluoro-1-octanol 7 g, yield, 96%, mp 48-9° C. The product 1,1,2,2,5,5,6,6-octahydroperfluoro-1-octanol was characterized by H NMR and F NMR as shown below:

H NMR (CDCl3) 1.51 (t, J=6 Hz, 1H), 2.34 (m, 6H), 2.47 (m, 2H), 3.97 (q, J=6 Hz, 2H) ppm. F NMR (CDCl3)-85.9 (s, 3F), −114.1 (m, 2F), −116.0 (m, 2F), −119.2 (m, 2F) ppm.

Example 6

A mixture of 1,1,2,2,5,5,6,6-octahydroperfluoro-1-iodooctane (136.91 g, 248.88 mmol) prepared as in Example 1, and N-methylformamide (NMF) (273 mL) was heated to 150° C. for 19 hours. The reaction mixture was washed with water (4×500 mL) to give a residue. A mixture of this residue, ethanol (200 mL), and concentrated hydrochloric acid (1 mL) was gently refluxed (85° C. bath temperature) for 2.5 hours. The reaction mixture was washed with water (200 mL×2), diluted with dichloromethane (200 mL), dried over sodium sulfate overnight. The dichloromethane solution was concentrated and distilled at reduced pressure to give 1,1,2,2,5,5,6, 6-octahydroperfluoro-1-octanol, 50.8 g.

Example 7

An oligomer iodide mixture, $F(CF_2CF_2CH_2CH_2)_nI$ (prepared as in Example 2 without separation of the iodides) wherein n=2, 3 were major components in about 2:1 ratio) (46.5 g) was mixed with N-methylformamide (NMF) (273 mL) and heated to 150° C. for 19 hours. The reaction mixture was washed with water (4×500 mL) to give a residue. A mixture of this residue, ethanol (200 mL), and concentrated hydrochloric acid (1 mL) was gently refluxed (85° C. bath temperature) for 24 hours. The reaction mixture was poured into water (300 mL). The solid was washed with water (2×75 mL) and dried under vacuum (2 torr, 267 Pa) to give a solid, 24.5 g. About 2 g of product was sublimed. The total yield of oligomer alcohols was 26.5 g.

Example 8

A mixture of N-methylformamide (135 mL) and 1,1,2,2, 5,5,6,6,9,9,10,10-dodecahydroperfluoro-1-iodododecane (65.62 g) prepared as in Example 1, was heated to 150° C. for 4 hours. The reaction mixture was washed with water (1 L) to give a solid product. This solid product was added ethanol (150 mL) and concentrated hydrochloric acid (1 mL) to the solids and heated at reflux (85° C.) for 19 hours. The reaction mixture was poured into water (500 mL) and the resulting solid was washed with water (3×300 mL), dried on vacuum to give 1,1,2,2,5,5,6,6,9,9,10,10-dodecahydroperfluoro-1-dodecanol (50.8 g), yield 98%, mp 112-5° C.

The product 1,1,2,2,5,5,6,6,9,9,10,10-dodecahydroperfluoro-1-dodecanol was characterized by H NMR and F NMR as shown below:

H NMR (CDCl3) 1.52 (br s, 1H), 2.34 (m, 10H), 3.97 (q, J=6 Hz, 2H) ppm.

F NMR (CDCl3) −85.9 (s, 3F), −114.2 (m, 2F), −115.8 (m, 4F), −116.1 (m, 2F), −119.2 (m, 2F) ppm.

Example 9

A 100 mL flask was charged with 1,1,2,2,5,5,6,6-octahydroperfluorooctanol (24.1 g) prepared as in Example 6, triethylamine (10.8 g), and tetrahydrofuran (10 mL). Acryloyl chloride (9.7 g) in tetrahydrofuran (10 mL) was added drop wise at about 10C. Another 30 mL tetrahydrofuran was added and the resulting mixture was stirred at room temperature for 22 hours. The reaction mixture was poured into water (150 mL) and extracted with dichloromethane (300 mL). The dichloromethane extract was washed with water (4×100 mL) and neutralized, dried over anhydrous sodium sulfate and added inhibitor (6.06 g of a solution of 1505 micrograms per gram of 4-methoxyphenol in dichloromethane). The solution was concentrated and distilled at reduced pressure to give 1,1,2,2,5,5,6,6-octahydroperfluorooctyl acrylate, 24.1 g, bp 31-50° C. at 15 torr (2000 Pa), 84% yield. The product 1,1, 2,2,5,5,6,6-octahydroperfluorooctyl acrylate was characterized by C NMR, H NMR and F NMR as shown below:

C NMR (CDCl3) 22.0 (tt, J=28, 4 Hz), 23.2 (ft, J=23, 5 Hz), 29.6 (t, J=22 Hz), 57.1 (t, J=5 Hz), 115.1 (tq, J=253, 38 Hz), 118.00 (ft, J=253, 37 Hz), 118.03 (ft, J=250, 38 Hz), 119.0 (qt, J=285, 35 Hz), 128.0, 131.4, 165.8 ppm.

H NMR (CDCl3) 2.34 (m, 4H), 2.47 (m, 2H), 4.45 (t, J=7 Hz, 2H), 5.86 (dd, J=10, 1.4, 1H), 6.12 (dd, J=17, 10, 1H), 6.43 (dd, J=17, 1.4, 1H) ppm.

F NMR (CDCl3)-85.9 (s, 3F), −114.4 (m, 2F), −115.9 (m, 2F), −119.2 (m, 2F) ppm.

Example 10

A 500 mL flask was charged with the oligomer alcohols from Example 4 (24.5 g), triethylamine (9.8 g), and tetrahydrofuran (100 mL). Acryloyl chloride (8.8 g) in tetrahydrofuran (10 mL) was added drop wise at about 10° C. Another 40 mL tetrahydrofuran was added and the resulting mixture was stirred at room temperature for 15 hours, then at 30° C. for 2 hours. The solid was removed by filtration and washed with tetrahydrofuran (50 mL). The combined filtrate and washer were concentrated to give a residue. The residue was mixed with ether (600 mL) and ether insoluble solids were removed by filtration. The ether solution was then washed with $NaHCO_3$ to almost neutral then water (3×50 mL), NaCl (saturated), dried over anhydrous $Na_2SO_4$, concentrated and dried on vacuum to solid acrylate product 19.8 g.

Example 11

A 100 mL flask was charged with 1,1,2,2,5,5,6,6-octahydroperfluorooctanol (2.5 g) prepared as in Example 6, triethylamine (1.2 g), and tetrahydrofuran (10 mL). Methacryloyl chloride (1.2 g), in tetrahydrofuran (6 mL) was added drop-wise at about 10C. Another 30 mL of tetrahydrofuran was added and the resulting mixture was stirred at room temperature for 18 hours. The reaction mixture was poured into water (50 mL) and extracted with dichloromethane (3×50 mL). The dichloromethane extract was washed with water until neutral, dried over anhydrous sodium sulfate and added inhibitor (0.154 g of a solution of 1505 micrograms per gram of 4-methoxyphenol in dichloromethane). The solution was concentrated and dried on vacuum to give a wax product, 2.86 g, 93% yield. The product 1,1,2,2,5,5,6,6-octahydroperfluorooctyl methacrylate was characterized by H NMR and F NMR as shown below:

H NMR (CDCl3) 1.95 (m, 3H), 2.34 (m, 4H), 2.46 (m, 2H), 4.44 (t, J=7 Hz, 2H), 5.59 (m, 1H), 6.13 (m, 1H) ppm.

F NMR (CDCl3) −85.9 (s, 3F), −114.4 (m, 2F), −115.9 (m, 4F), −119.2 (m, 2F) ppm.

Example 12

A 500 mL flask was charged with 1,1,2,2,5,5,6,6,9,9,10,10-dodecahydroperfluorododecanol (33.9 g) prepared as in Example 8, triethylamine (10.7 g), and tetrahydrofuran (200 mL). Acryloyl chloride (9.5 g) in tetrahydrofuran (10 mL) was added drop wise at about 14° C. The resulting mixture was stirred at room temperature for 15 hours. The reaction mixture was distilled on vacuum to remove solvent. The resulting residue was extracted with ether (3×300 mL). The combined ether extracts were washed with water (2×150 mL), dried over $Na_2SO_4$, concentrated and dried on vacuum to give 8.95 g product. The ether extracted residue was mixed with acetone (400 mL) and passed through silica gel column (about 300 g silica gel). The column was rinsed with acetone (2×500 mL). The combined acetone solution was concentrated and dried on vacuum to give 22 g of product. The combined yield was 8.95 g+22 g=31.95 g, 84%, mp 78-79° C. The product 1,1,2,2,5,5,6,6,9,9,10,10-dodecahydroperfluorododecyl acrylate was characterized by H NMR and F NMR as shown below:

H NMR (acetone-d6) 2.49 (m, 10H), 4.45 (t, J=7 Hz, 2H), 5.92 (dd, J=10, 1.7, 1H), 6.15 (dd, J=17, 10, 1H), 6.38 (dd, J=17, 1.6, 1H) ppm.

F NMR (acetone-d6) −86.8 (s, 3F), −115.9 (m, 2F), −117.1 (4F), −117.4 (2F), −119.6 (m, 2F) ppm.

Example 13

A mixture of oleum (15% $SO_3$, 125 mL) and 1,1,2,2,5,5,6,6-octahydroperfluoro-1-iododecane (12 g) prepared as in Example 1 was heated to 60° C. for 2 h. A $Na_2SO_3$ solution (4 g, in water 100 mL) was slowly added to the reaction mixture at 60° C. bath between 65° C. to 90° C. internal temperatures. The resulting mixture was heated to 90° C. for 30 min. After being cooled to room temperature, a solid was precipitated. The liquid was decanted and the solid was dissolved in ether (150 mL) and washed with $Na_2SO_3$ (1M, 20 mL), water (2×20 mL), NaCl (sat. 20 mL), dried over anhydrous $Na_2SO_4$, concentrated and dried on vacuum to give to give a residue which was further purified by distillation to give an off-white solid 6.2 g, bp, 65-79° C. at 2 torr (267 Pa) as 1,1,2,2,5,5,6,6-octahydroperfluoro-1-decanol. The product was characterized by MS, H NMR and F NMR as shown below.

MS (m/e) 392 (M+, 0.16%), 372 (3.3%), 342 (60%), 323 (53%), 223 (29%), 95 (100%). H NMR (CDCl3) 1.58 (s, 1H), 2.36 (m, 6H), 3.97 (t, J=7 Hz, 2H) ppm. F NMR (CDCl3)-81.5 (tt, J=9.5, 3 Hz, 3F), −114.1 (m, 2F), −115.4 (m, 2F), −116.0 (m, 2F), −124.8 (m, 2F), −126.4 (m, 2F) ppm.

Example 14

A 1 L flask was charged 1,1,2,2,5,5,6,6-octahydroperfluoro-1-iododecane (135.3 g) prepared as in Example 1, and N-methylformamide (250 mL). The mixture was heated to 150° C. for 15 hours. After the reaction mixture was cooled to room temperature, water (600 mL) was added and stirred for several minutes. The bottom layer was isolated and washed with water (3×800 mL). Ethanol (290 mL) and concentrated hydrochloric acid (about 1 mL) were then added. The mixture was heated at reflux for 22 hours. The ethanol was removed by distillation. The residue was then washed with water (3×100 mL). Dichloromethane (250 mL) was added and the resulting solution was washed again with water (2×100 mL) then neutralize with an aqueous solution of sodium carbonate to pH~7. The dichloromethane solution was dried with anhydrous sodium sulfate, concentrated and further purified by distillation at reduced pressure to give a white solid, 1,1,2,2,5,5,6,6-octahydroperfluoro-1-decanol, 60.2 g.

Example 15

A 100 mL flask was charged with 1,1,2,2,5,5,6,6-octahydroperfluorodecanol (5.4 g) prepared as in Example 13, triethylamine (1.8 g), and tetrahydrofuran (20 mL). Methacryloyl chloride (1.7 g) in tetrahydrofuran (2 mL) was added drop-wise at room temperature. The resulting mixture was stirred at room temperature for 15 hours. The resulting solid was removed by filtration and washed with ether (2×50 mL). The combined filtrate and washers were washed with water (2×10 mL), HCl (0.05N, 10 mL), water (10 mL), NaCl (sat. 10 mL), concentrated and dried on vacuum to give an oil 5.75 g, 91% yield. The product 1,1,2,2,5,5,6,6-octahydroperfluorodecyl methacrylate was characterized by H NMR and F NMR as shown below.

MS (m/e) 460 (M+, 15%), 445 (0.3%), 375 (0.1%), 335 (5.7%), 277 (2.4%), 95 (100%). NMR H NMR (CDCl3) 1.87 (s, 3H), 2.31 (m, 6H), 4.36 (t, J=7 Hz, 2H), 5.52 (m, 1H), 6.05 (m, 1H) ppm. F NMR (CDCl3)-81.6 (it, J=10, 3 Hz, 3F), −114.5 (m, 2F), −115.5 (m, 2F), −116.0 (m, 2F), −124.8 (m, 2F), −126.5 (m, 2F) ppm.

Example 16

A 500 mL flask was charged 1,1,2,2,5,5,6,6,9,9,10,10-dodecahydroperfluoro-1-dodecanol prepared in Example 8 (25.5 g), triethylamine (8.0 g), and tetrahydrofuran (170 mL). The mixture was heated to 50° C. to dissolve all solids, then cooled to about 35° C. A methacryloyl chloride (8.3 g) solution in tetrahydrofuran (30 mL) was added drop-wise with stirring (250 rpm) over a 2-hour period at 35° C. The reaction mixture was then stirred at 25-30° C. for 4-hours and at 35° C. for 1 hour. The volatiles were removed by vacuum distillation at room temperature to afford a residue. The residue was washed with water (2×400 mL), dried on vacuum to give a solid product, 27.1 g, 91% yield, mp, 79-81° C. The product 1,1,2,2,5,5,6,6,9,9,10,10-dodecahydroperfluorododecyl methacrylate was characterized by H NMR and F NMR as shown below.

H NMR (CDCl3) 1.95 (m, 3H), 2.34 (m, 8H), 2.46 (it, J=18, 7 Hz, 2H), 4.44 (t, J=7 Hz, 2H), 5.59 (m, 1H), 6.13 (m, 1H) ppm. F NMR (CDCl3)-85.9 (s, 3F), −114.5 (m, 2F), −115.8 (m, 4F), −116.0 (m, 2F), −119.2 (m, 2F) ppm.

Example 17

A mixture of 1,1,2,2,5,5,6,6-octahydroperfluoro-1-iodooctane (8.9 g), as prepared in Example 1 and acetone (30 mL) was refluxed for 5 hours. After being cooled to room temperature, the reaction mixture was poured into water (200 mL). The resulting solid was collected by filtration and washed with water (2×40 mL), dried on vacuum to give 7.1 g of 1,1,2,2,5,5,6,6-octahydroperfluorooctyl thiocyanate as a white solid. The product was characterized by GC-MS, H NMR and F NMR as shown below.

MS (m/e) 333 (M+, 100%), 255 (24%), 235 (30%), 306 (11%), 197 (49%), 177 (91%), 77 (92%). H NMR (CDCl3) 2.28 (m, 4H), 2.55 (m, 2H), 3.10 (m, 2H) ppm. F NMR −85.9 (s, 3F), −114.7 (m, 2F), −115.4 (m, 2F), −119.2 (t, J=17 Hz, 2F) ppm.

Example 18

An oligomer iodide, $F(CF_2CF_2CH_2CH_2)_nI$, (the Example 3 reaction mixture without separation of the oligomers wherein n=2, 3 were major components in about 2:1 ratio) (10 g) was added to a solution of sodium azide (2.03 g) in acetonitrile (90 mL)-water (34 mL). The mixture was allowed to heat at 90° C. until the reaction was determined complete by gas chromatography. By 36 hours, complete conversion of the iodide to azide was observed. The mixture was cooled to room temperature and the bulk of the acetonitrile under vacuum. The resulting slurry was extracted with methylene chloride (3×60 mL). The organic layer washed with water (2×80 mL), brine (1×80 mL) and dried over anhydrous $MgSO_4$. Evaporation of the solvent and vacuum drying provided the oligomer azide $F(CF_2CF_2CH_2CH_2)_nN_3$ as a white solid (6.0 g). GC-MS: 2 major Peaks correspond to n=2 and n=3 azides in about 2:1 ratio:

$^1$H NMR (CDCl$_3$): δ 3.52 (bt, J=6.0 Hz, N—CH$_2$), 2.29 (bm, CF$_2$—CH$_2$'s)

Example 19

An oligomer azide mixture, $F(CF_2CF_2CH_2CH_2)N_3$, prepared as per Example 18 wherein n=2, 3 were major components in about 2:1 ratio) (2.25 g), and Ni-Raney (0.032 g) and was added to a solution ethanol (5 mL) and water (5 mL). To the stirring mixture was slowly added hydrazine hydrate (0.328 g). After the addition was complete, the mixture was progressively heated to 60° C. and stirred at 60° C. for 12 h. The reaction mixture was cooled to room temperature and methylene chloride (30 mL) was added and stirred for 10 minutes. The resulting mixture was filtered and washed with water (2×20 mL) and brine (1×20 mL). Evaporation of the solvent followed by recrystallization from methylene chloride/hexane provided the amine $F(CF_2CF_2CH_2CH_2)_nNH_2$ as a light brown solid (1.9 g). GC: 2 major Peaks correspond to n=2 and n=3 amines (about 2:1 ratio). $^1$H NMR (CDCl3): δ 3.05 (bt, J=6.0 Hz, NH$_2$—CH$_2$), 2.29 (bm, CF$_2$—CH$_2$'s)

Example 20

An oligomer iodide, $F(CF_2CF_2CH_2CH_2)_nI$, (the Example 3 reaction mixture without separation of the oligomers wherein n=2, 3 were major components in about 2:1 ratio) (10 g) was added to a solution of thiourea (2.03 g) in absolute ethanol (100 mL) kept at 70° C. The mixture was continued to heat at 80° C. until the reaction was determined complete by the disappearance of iodide by gas chromatography. By 36 hours, 98% consumption of the iodide was observed. The mixture was concentrated and treated with a solution of sodium hydroxide (1.92 g) in water (5 mL). The mixture was stirred overnight at ambient temperature and then heated to boiling for 30 min. The reaction mixture was then cooled to ambient temperature and 5% sulfuric acid was added drop wise until solution was acidic. The mixture was then extracted with methylene chloride (3×50 mL), the organic layer dried over anhydrous $MgSO_4$ and evaporated to obtain the oligomeric thiols [$F(CF_2CF_2CH_2CH_2)_nSH$] as a white solid (5.8 g).

GC-MS: 2 major peaks corresponded to n=2 [(m/e) 308] and n=3 thiols [(m/e) 436] in about 2:1 ratio.

$^1$H NMR (CDCl$_3$): δ 2.79 (bt, J=6.0 Hz, S—CH$_2$), 2.32 (bm, CF$_2$—CH$_2$'s)

Example 21

To a solution of 2-mercaptoethanol (1.41 g) and sodium hydroxide (0.720 g) in tert-butanol (10 mL) heated to 80° C., was slowly added oligomer iodide, $F(CF_2CF_2CH_2CH_2)_nI$ (Example 3 reaction mixture without separation of the oligomers wherein n=2, 3 were major components in about 2:1 ratio) (5 g). The mixture was allowed to heat at 80° C. for 12 h and the reaction was determined complete by gas chromatography. The mixture was cooled to ambient temperature and the precipitated product was filtered and washed repeatedly with cold water followed by a mixture of 1:1 methylene chloride and hexane. The yellowish white solid was dried under vacuum to obtain the alcohol $F(CF_2CF_2CH_2CH_2)_n SCH_2CH_2OH$ as a mixture of oligomers (3.4 g). GC-MS: 2 major peaks corresponded to n=2 [(m/e) 352] and n=3 alcohols [(m/e) 480] in about 2:1 ratio.

Example 22

To a solution of 2-aminoethanethiol (1.39 g) and sodium hydroxide (0.720 g) in tert-butanol (10 mL)heated to 80° C. was slowly added oligomer iodide, $F(CF_2CF_2CH_2CH_2)_nI$ (Example 3 reaction mixture without separation of the oligomers. n=2, 3 were major components in about 2:1 ratio) (5 g), The mixture was allowed to heat at 80° C. for 12 h and the reaction was determined complete by gas chromatography. The mixture was allowed to heat at 80° C. for 12 h and the reaction was determined complete by gas chromatography. The mixture was cooled to ambient temperature and the precipitated product was filtered and washed repeatedly with cold water followed by a mixture of 1:1 methylene chloride and hexane. The white solid was dried under vacuum to obtain the amines $F(CF_2CF_2CH_2CH_2)_nSCCH_2CH_2NH_2$ as a mixture of oligomers (3.9 g). GC-MS: 2 major peaks corresponded to n=2 [(m/e) 351] and n=3 amines [(m/e) 479] in about 2:1 ratio.

Example 23

To a mixture of oligomeric amine [$F(CF_2CF_2CH_2CH_2)_n NH_2$] prepared as in Example 19, (n=2, 3 were major components in about 2:1 ratio) (1.0 g) and triethylamine (0.220 g) in methylene chloride (20 mL) kept at 0° C. was added drop wise a solution of methacryloyl chloride (0.228 g) in methylene chloride (10 mL). The reaction mixture was stirred 8 h at ambient temperature. Water (20 mL) was added to the reaction mixture and the organic layer separated and washed with 1N HCl (2×20 mL), sat. NaHCO_3 (2×20 mL) and brine (1×20 mL). The organic layer separated and dried over anhydrous MgSO_4. Removal of the solvent under reduced pressure followed by repeated washing of the solid product with a mixture of cold methylene chloride and hexane (1:4) produced oligomer acrylamide $F(CF_2CF_2CH_2CH_2)_nNHC(O)C(CH_3)=CH_2$ as a white solid (0.7 g).

$^1$H NMR (CDCl_3): δ 5.9 (bs, NH), 5.60 (d, J=1.0 Hz, =CH), 5.28 (q, J=1.2 Hz, =CH), 3.58 (q, J=6.0 Hz, NHCH_2), 2.25 (bm, CF_2CH_2's), 1.89 (t, J=1.2 Hz, CH_3)

Example 24

To a solution of 1,1,2,2,5,5,6,6-octahydroperfluoro-1-octanol (1.5 g) (prepared as in Example 5) in methylene chloride (20 mL) kept at 0° C. was added 2-isocyanatoethylmethacrylate (0.724 g) and catalytic dibutyltindilaurate (0.01 g). The mixture was stirred at ambient temperature for 12 hours. The solvents were stripped off under vacuum and the resulting gummy solid was washed repeatedly with cold hexane-methylene chloride mixture (4:1). The product was then dried under vacuum to obtain the urethane acrylate $F(CF_2CF_2CH_2CH_2)_2OC(O)NH—CH_2CH_2OC(O)CH(Me)=CH_2$ as a white solid (2.1 g).

$^1$H NMR (CDCl_3): δ 6.14 (t, J=1.0 Hz, 1H), 5.62 (q, J=2.0 Hz, 1H), 5.00 (bs, 1H), 4.38 (t, J=7.0 Hz, 2H), 4.26 (t, J=5.8 Hz, 2H), 3.54 (q, J=6 Hz, 2H), 2.37 (m, 6H), 1.97 (q, J=1 Hz, 3H): $^{19}$F NMR (CDCl3): 6-86.3 (m, 3F), −113.3 (m, 2F), −115.0 (m, 2F), −120.1 (m, 2F)

Example 25

To a mixture of oligomeric amine $F(CF_2CF_2CH_2CH_2)_n NH_2$ prepared as per Example 19 (wherein n=2, 3 were major components in about 2:1 ratio) (0.5 g) in methylene chloride (15 mL) kept at 0° C. was added 2-isocyanatoethylmethacrylate (0.163 g) and the mixture was stirred at ambient temperature for 12 hours. The precipitated solid was filtered of, washed repeatedly with cold hexane-methylene chloride mixture (3:1). The product was then dried under vacuum to obtain the urea acrylate $F(CF_2CF_2CH_2CH_2)_nNHC(O)NHCH_2CH_2OC(O)C(Me)=CH_2$ as a white solid (0.48 g). $^1$H NMR (CDCl3): δ6.04 (t, J=1.6 Hz, =CH), 5.52 (quintet, J=1 Hz, =CH), 4.56 (bs, NH), 4.16 (t, J=6.0 Hz, OCH_2), 3.46 (2 merging q, J=5.6 Hz, NHCH_2), 2.24 (bm, CF_2CH_2's), 1.87 (t, J=1.2 Hz, CH_3)

Example 26

To a mixture of oligomer alcohol (Example 21, $F(CF_2CF_2CH_2CH_2)_nSCH_2CH_2OH$ (wherein n=2, 3 were major components in about 2:1 ratio) (0.700 g) and triethylamine (0.166 g) in methylene chloride (20 mL) kept at 0° C. was added drop wise a solution of methacryloyl chloride (0.172 g) in methylene chloride (10 mL). The reaction mixture was stirred 12 hours at ambient temperature. Water (20 mL) was added to the reaction mixture and the organic layer separated and washed with 1N HCl (2×20 mL), saturated NaHCO_3 (2×20 mL) and brine (1×20 mL). The organic layer was separated and dried over anhydrous MgSO_4. Removal of the solvent under reduced pressure followed by repeated washing of the solid product with a mixture of cold methylene chloride and hexane (1:4) produced a mixture of oligomer acrylate $F(CF_2CF_2CH_2CH_2)_nSCH_2CH_2OC(O)C(Me)=CH_2$ as a white solid (0.42 g).

$^1$H NMR (CDCl3): δ6.1 (t, J=1.0 Hz, =CH), 5.62 (t, J=1.6 Hz, =CH), 4.36 (t, J=6.8 Hz, OCH_2), 2.85 (t, J=6.8 Hz, SCH_2), 2.81 (m, SCH_2), 2.35 (bm, CF_2CH_2's), 1.98 (t, J=1.2 Hz, CH_3).

Example 27

To a mixture of oligomer amine (Example 22, $F(CF_2CF_2CH_2CH_2)_nSCH_2CH_2NH_2$ (wherein n=2, 3 were major components in about 2:1 ratio) (0.700 g) and triethylamine (0.166 g) in methylene chloride (20 mL) kept at 0° C. was added drop wise a solution of methacryloyl chloride (0.228 g) in methylene chloride (10 mL). The reaction mixture was stirred 8 hours at ambient temperature. Water (20 mL) was added to the reaction mixture and the organic layer separated and washed with 1N HCl (2×20 mL), saturated NaHCO_3 (2×20 mL) and brine (1×20 mL). The organic layer was separated and dried over anhydrous MgSO_4. Removal of the solvent under reduced pressure followed by repeated washing of the solid product with a mixture of cold methylene chloride and hexane (1:4) produced mixture of oligomer acryloyl amide $F(CF_2CF_2CH_2CH_2)_nSCH_2CH_2NHC(O)C(Me)=CH_2$ as a white solid (0.530 g).

$^1$H NMR (CDCl3): δ 6.2 (bs, NH), 5.79 (s, =CH), 5.38 (q, J=1.2 Hz, =CH), 3.56 (q, J=6.0 Hz, NCH_2), 2.79 (t, J=6.6 Hz, SCH_2), 2.77 (t, J=6.6 Hz, SCH_2), 2.37 (bm, CF_2CH_2's), 2.0 (s, CH_3)

What is claimed is:

1. A compound of formula (I):

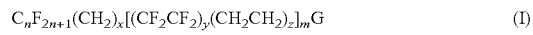

$$C_nF_{2n+1}(CH_2)_x[(CF_2CF_2)_y(CH_2CH_2)_z]_mG \qquad (I)$$

wherein
G is an I; OH; OC(O)CH=CH_2; OC(O)CCH_3=CH_2; OC(O)CCl=CH_2; NR_1H; N_3; NCO; SQ wherein Q is H, alkyl, (CH_2)_nOH, (CH_2)_nNH_2, (CH_2)_nOC(O)C(Me)=CH_2, or (CH_2)_nNHC(O)C(Me)=CH_2; SCN; COOH; SO_3H; NHCOCH=CH_2; NHCOC(CH_3)=CH_2); OC(O)NHCH_2CH_2OC(O)C(CH_3)=CH_2; or OC(O)NHCH_2CH_2OC(O)C(CH_3)=CH_2;
subscript n is an integer from 1 to about 6,
subscript x is an integer from 1 to about 6,
subscripts y and z are each independently 1, 2 or 3, or a mixture thereof, and subscript m is 1 or 2 or a mixture thereof, and
the total number of carbons in said formula (I) excluding G ranges from 8 to 22.

2. The compound of claim 1 wherein x is 2, y and z are Each 1, and m is 1 or 2.

3. The compound of claim 1 wherein G is iodide.

4. The compound of claim 3 which is 1,1,2,2,5,5,6,6-octahydroperfluoro-1-iodooctane; 1,1,2,2,5,5,6,6,9,9,10,10-dodecahydroperfluoro-1-iodododecane; 1,1,2,2,5,5,6,6-octahydroperfluoro-1-iododecane; 1,1,2,2,5,5,6,6,9,9,10,10-dodecahydroperfluoro-1-iodotetradecane; or a mixture thereof.

5. The compound of claim 1 wherein G is hydroxyl.

6. The compound of claim 5 which is 1,1,2,2,5,5,6,6-octahydroperfluoro-1-octanol; 1,1,2,2,5,5,6,6,9,9,10,10-dodecahydroperfluoro-1-dodecanol; 1,1,2,2,5,5,6,6-octahydroperfluoro-1-decanol; 1,1,2,2,5,5,6,6,9,9,10,10-dodecahydroperfluoro-1-tetradecanol; or a mixture thereof.

7. The compound of claim 1 wherein G is acrylate.

8. The compound of claim 7 which is 1,1,2,2,5,5,6,6-octahydroperfluorooctyl acrylate; 1,1,2,2,5,5,6,6,9,9,10,10-dodecahydroperfluorododecyl acrylate; 1,1,2,2,5,5,6,6-octahydroperfluorodecyl acrylate; 1,1,2,2,5,5,6,6,9,9,10,10-dodecahydroperfluorohtetradecyl acrylate; or a mixture thereof.

9. A compound of formula (I):

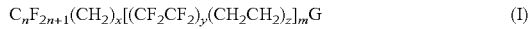

$$C_nF_{2n+1}(CH_2)_x[(CF_2CF_2)_y(CH_2CH_2)_z]_mG \qquad (I)$$

wherein
G is a methacrylate;
subscript n is an integer from 1 to 6,
subscript x is an integer from 1 to 6,
subscripts y and z are each independently 1, 2 or 3, or a mixture thereof, and subscript m is 1 or 2 or a mixture thereof, and
the total number of carbons in said formula (I) excluding G ranges from 8 to 22.

10. The compound of claim 9 which is 1,1,2,2,5,5,6,6-octahydroperfluorooctyl methacrylate; 1,1,2,2,5,5,6,6,9,9,10,10-dodecahydroperfluorododecyl methacrylate; 1,1,2,2,5,5,6,6-octahydroperfluorodecyl methacrylate; 1,1,2,2,5,5,6,6,9,9,10,10-dodecahydroperfluorotetradecyl methacrylate; or a mixture thereof.

11. The compound of claim 1 wherein G is chloroacrylate.

12. The compound of claim 11 which is 1,1,2,2,5,5,6,6-octahydroperfluorooctyl chloroacrylate; 1,1,2,2,5,5,6,6,9,9,10,10-dodecahydroperfluorododecyl chloroacrylate; 1,1,2,2,5,5,6,6-octahydroperfluorodecyl chloroacrylate; 1,1,2,2,5,5,6,6,9,9,10,10-tetradecahydroperfluoro-hexadecyl chloroacrylate; or a mixture thereof.

13. A process for the preparation of a compound of claim 1 comprising oligomerization of a perfluoroalkyl iodide, perfluoroalkylethyl iodide or perfluoroalkylmethyl iodide with a mixture of tetrafluoroethylene and ethylene in a gas phase in a ratio of iodide to mixture of tetrafluoroethylene and ethylene of from 1:3 to 20:1.

14. The process of claim 13 wherein the moles of perfluoro iodide to the moles of mixture of tetrafluoroethylene and ethylene is from 1:2 to 5:1.

15. The process of claim 13 wherein the compound has a maximum molecular weight of 1000.

* * * * *